(12) United States Patent
Gren

(10) Patent No.: US 10,129,559 B2
(45) Date of Patent: Nov. 13, 2018

(54) IMAGE COMPRESSION

(71) Applicant: Microsoft Technology Licensing, LLC, Redmond, WA (US)

(72) Inventor: Juuso Gren, Kyroskoski (FI)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 17 days.

(21) Appl. No.: 15/189,667

(22) Filed: Jun. 22, 2016

(65) Prior Publication Data
US 2017/0374373 A1 Dec. 28, 2017

(51) Int. Cl.
*G06K 9/00* (2006.01)
*H04N 19/50* (2014.01)

(52) U.S. Cl.
CPC .................... *H04N 19/50* (2014.11)

(58) Field of Classification Search
CPC ...................................... H04N 19/20
See application file for complete search history.

(56) References Cited

U.S. PATENT DOCUMENTS

| | | | | |
|---|---|---|---|---|
| 5,065,447 A * | 11/1991 | Barnsley | ............... | G06T 9/001 358/426.04 |
| 5,574,503 A | 11/1996 | May | | |
| 6,130,911 A | 10/2000 | Lei | | |
| 6,337,880 B1 | 1/2002 | Cornog et al. | | |
| 6,529,631 B1 | 3/2003 | Peterson et al. | | |
| 7,729,423 B2 | 6/2010 | Kottke et al. | | |
| 2009/0208110 A1 * | 8/2009 | Hoppe | ...................... | G06T 9/00 382/190 |
| 2015/0371431 A1 * | 12/2015 | Korb | ..................... | G06T 9/00 382/113 |
| 2016/0173882 A1 * | 6/2016 | Mishra | ................. | H04N 19/136 375/240.08 |

OTHER PUBLICATIONS

Roos, et al., "Reversible Interframe Compression of Medical Images: A Comparison of Decorrelation Method", In Proceedings of IEEE Transactions on Medical Imaging, vol. 10, No. 4, Dec. 1991, pp. 538-547.
Ukrit, et al., "Effective lossless compression for medical image sequences using composite algorithm", In Proceedings of International Conference on Circuits, Power and Computing Technologies, Mar. 20, 2013, pp. 1122-1126.
Srikanth, et al., "Context-based Interframe Coding of MR Images", In Proceedings of the 3rd Indian Conference on Computer Vision, Graphics and Image Processing, Dec. 16, 2002, 6 pages.

* cited by examiner

*Primary Examiner* — Oneal R Mistry
(74) *Attorney, Agent, or Firm* — Alleman Hall Creasman & Tuttle LLP

(57) ABSTRACT

A method for compressing images includes identifying a set of image blocks from a plurality of digital images. For each image block from the set, image features of the image block are extracted. The set of image blocks is sorted into an ordered sequence of image blocks based on an average image feature difference between sequentially sorted image blocks. The set of image blocks is compressed into compressed image data based on inter block correlations between image blocks in the ordered sequence.

17 Claims, 9 Drawing Sheets

IMAGE COMPRESSION

BACKGROUND

Digital images are often stored on computing devices and transmitted over comp networks. Such digital images are often compressed in order to reduce the network bandwidth and storage space required to transmit and save the digital images.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A method for compressing images includes identifying a set of image blocks from a plurality of digital images. For each image block from the set, image features of the image block are extracted. The set of image blocks is sorted into an ordered sequence of image blocks based on an average image feature difference between sequentially sorted image blocks. The set of image blocks is compressed into compressed image data based on inter block correlations between image blocks in the ordered sequence.

DETAILED DESCRIPTION

Storage and/or transmission of large numbers of digital images can be limited by storage space and/or network bandwidth restrictions. However, individual digital images often share similarities that can be identified in order to reduce the amount of image data that must be stored and/or transmitted. For example, multiple digital photographs taken at the same location, on the same day, of a same landmark, etc., may have image features that are quantifiably similar. As an extreme example, when transmitting two or more images that are exactly identical, a single digital image may be transmitted, then copied one or more times at the destination, thereby reducing the bandwidth required for image transmission. Further, individual segments, or image blocks, of a digital image may be similar to other image blocks of the same image, or image blocks of other digital images.

Accordingly, the present disclosure is directed to a technique for compressing a plurality of digital images into compressed image data. Such compression is performed by a computing device after identifying a set of image blocks for a plurality of digital images, and extracting image features of each image block of the set. Based on the extracted image features, the computing device sorts the image blocks into an ordered sequence based on an average image feature difference between each image block. The ordered sequence of image blocks is then compressed by the computing device into compressed image data based on inter block correlations between image blocks in the ordered sequence. Such compressed image data may, for example, take the form of one or more key image blocks and multiple sets of block-difference data describing differences between each key image block and other image blocks of the ordered sequence, allowing the ordered sequence to be reconstructed from the key image block(s). Compressing digital images in this manner can result in more efficient storage and transmission of digital images as compared to existing compression techniques that compress digital images without regard to inter block correlations between individual digital images and/or age blocks.

Figure 1:
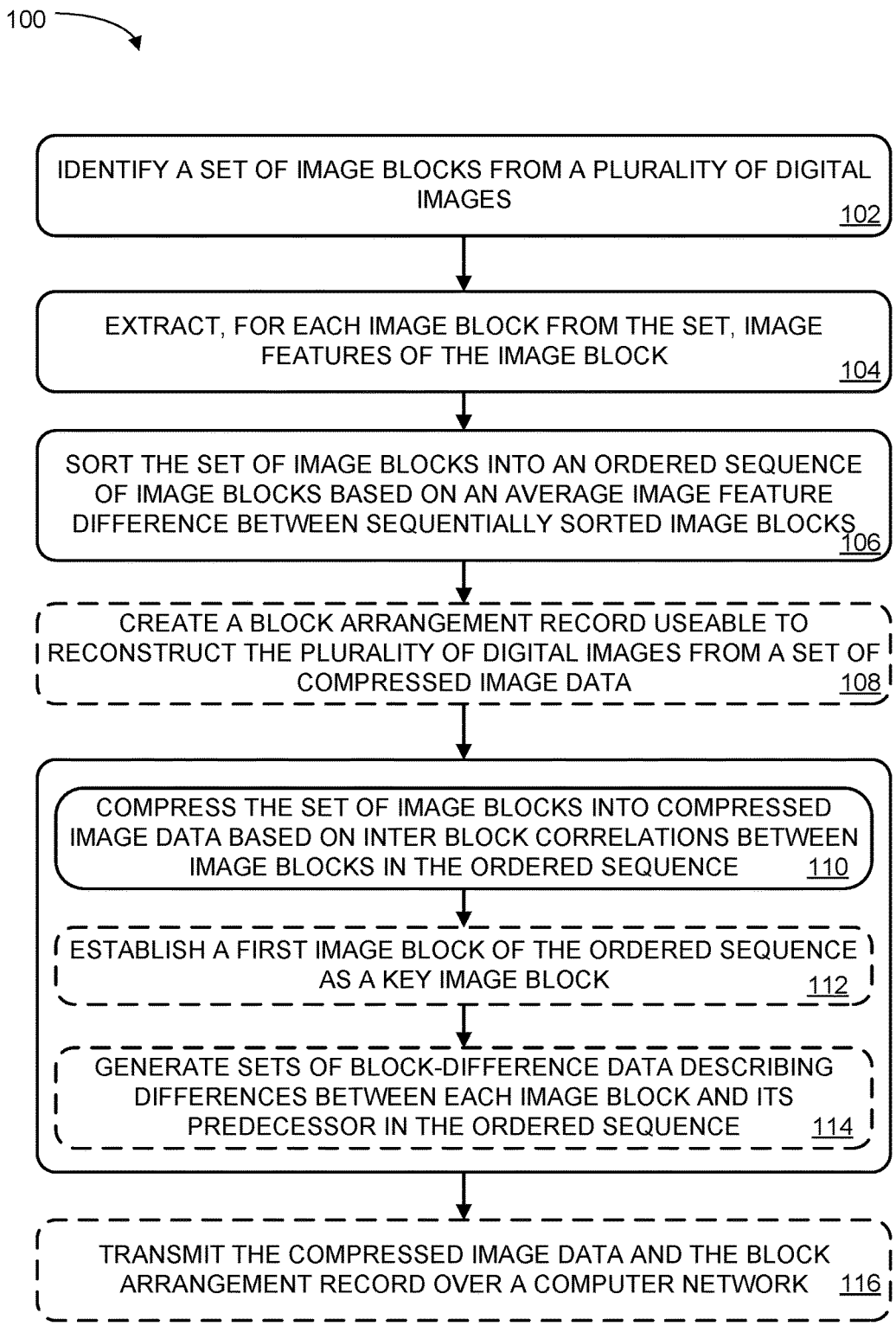
FIG. 1 schematically shows identification of a set of image blocks from a plurality of digital images.

FIG. 1 shows an example method 100 for compressing digital images. Method 100 may be carried out a logic machine of a computing device executing instructions held by a storage machine, as will be described below with respect to FIG. 9. In some implementations, the computing device may be part of the camera used to take the digital images. In some implementations, the computing device may be part of a user-computer used to manage a photo library. In some implementations, the computing device may be part of a server computer used to send/receive and/or store digital images.

Figure 2:
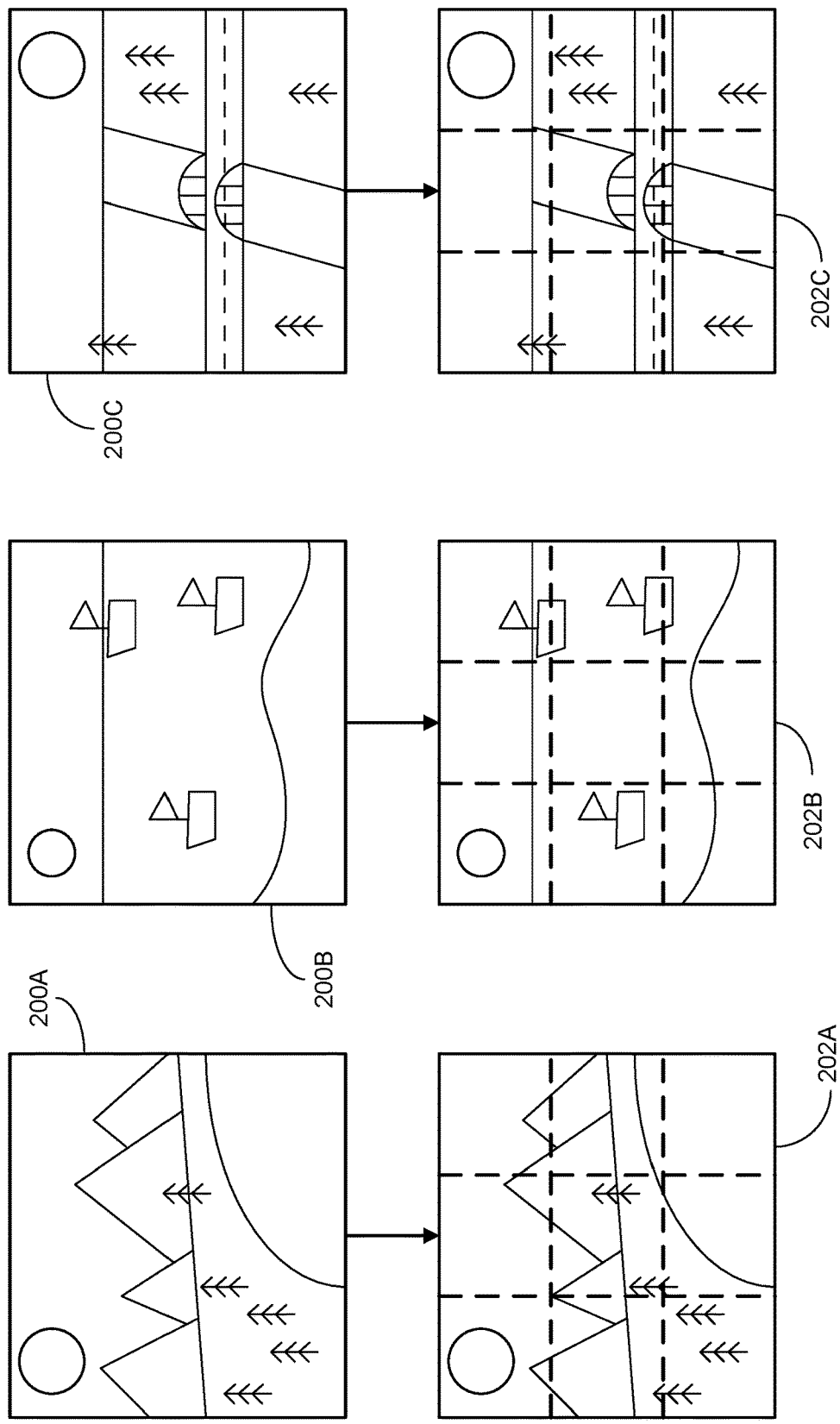
FIG. 2 illustrates an example method for compressing digital images.

At 102, method 100 includes identifying a set of image blocks from a plurality of digital images. This is schematically illustrated in FIG. 2. FIG. 2 schematically shows an example plurality of digital images 200. Specifically, FIG. 2 shows digital image 200A, digital image 200B, and digital image 200C. Digital images as described herein may include a variety of suitable digitally-stored visual media including, for example, digital photographs, computer-generated images, screenshots, documents, etc. Each of digital images 200A, 200B, and 200C are presented as examples, and are not intended to limit the scope of the present disclosure. Further, though three digital images are shown in FIG. 2, the compression techniques described herein may apply to greater or fewer than three images. In particular, the digital image compression techniques described herein may realize improved efficiency when applied to large numbers of digital images hundreds, thousands, millions). Importantly, the digital image compression techniques described herein are compatible with still images, each of which can be functionally independent of any other digital image.

FIG. 2 also shows, for the plurality of digital images 200, identification of a set of image blocks 202. Such identification of image blocks may be performed by a computing device storing the digital images, for example. In particular, image blocks 202A are identified from digital image 200A, image blocks 202B are identified from digital image 202B, and image blocks 202C are identified from digital image 202C. In general, each digital image may be divided into one or more image blocks. In some implementations, each digital image may be divided into the same number of image blocks. Alternatively, each digital image may be divided into a different number of image blocks, and/or each of a plurality of digital images may constitute single image block.

Image blocks such as those shown in FIG. 2 may be any suitable size and shape. For example, digital images may be divided into a grid of image blocks of uniform size (e.g., each image block has the same number of pixels). In some implementations, one or more image blocks of a digital image may be overlapping, and/or take on irregular/variable shapes and/or sizes. In general, a digital image may comprise one or more image blocks, and may be divided into image blocks in any suitable manner.

Figure 3:
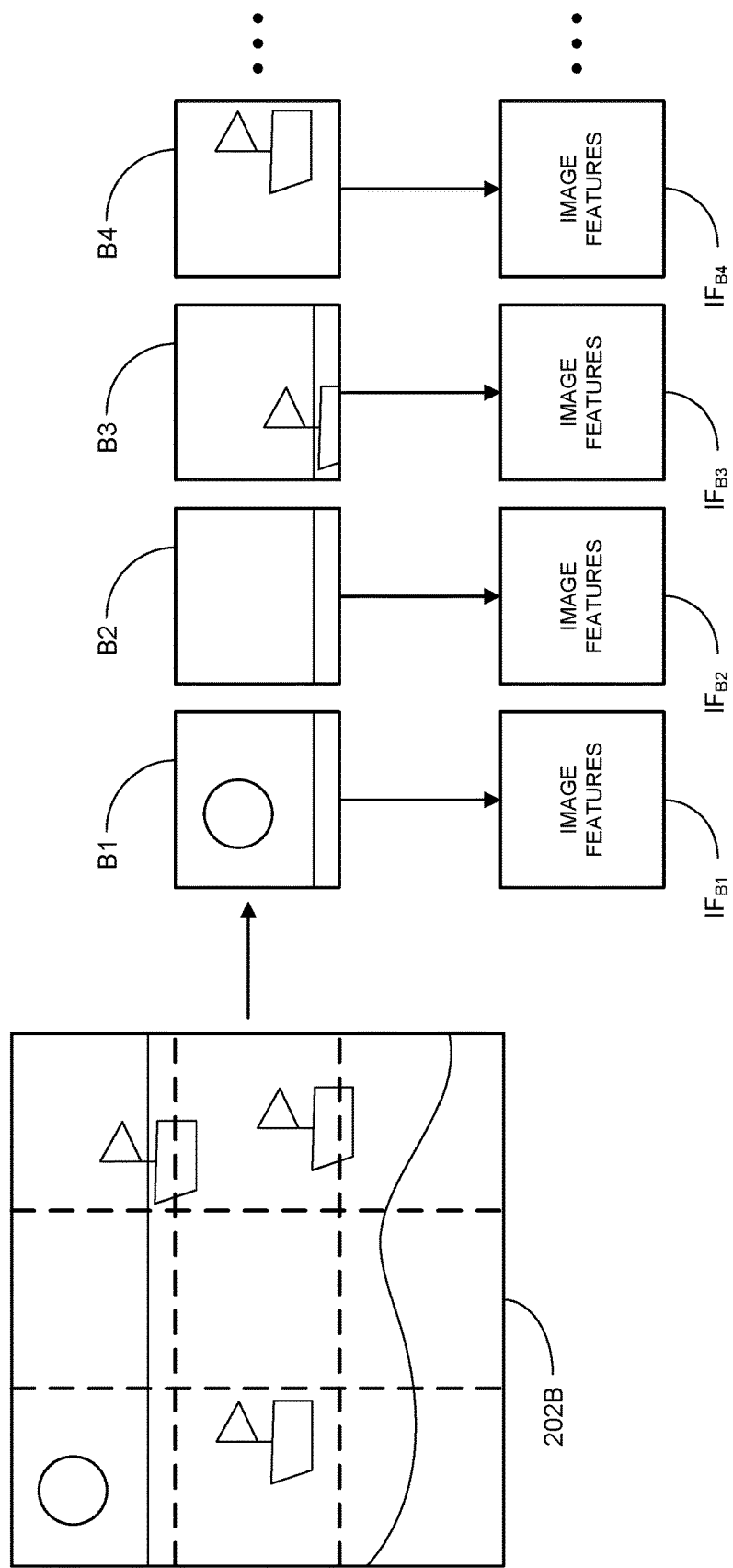
FIG. 3 schematically shows extraction of image features for each of a set of image blocks.

At 104, method 100 includes extracting, for each image block from the set, image features of the image block. This is schematically illustrated in FIG. 3. FIG. 3 schematically shows an example plurality of image blocks 202B, which may be identified from a digital image, such as digital image 200B shown in FIG. 2. Specifically, the plurality of image blocks 202B includes individual image blocks B1, B2, B3, and B4, as well as additional image blocks that are not explicitly labeled. As described above, the specific image blocks described herein are not intended to be limiting. The digital image compression techniques described herein may be used with images that are divided into any suitable number of image blocks having any suitable shapes and sizes.

FIG. 3 also shows extraction of image features from each mage block. Specifically, image features $IF_{B1}$ are extracted from image block B1, image features $IF_{B2}$ are extracted from image block B2, and on for each of the image blocks shown in FIG. 3.

Image feature extraction may be performed by a computing device via a variety of suitable image processing techniques, and "image features" as used herein may describe any data usable for describing aspects of a digital image. For example, extracting image features may include performing edge detection, corner detection, blob detection, color analysis, motion detection, image thresholding, frequency-domain transformation, texture analysis, etc. image feature extraction may be performed with image processing algorithms configured to output identified features from input digital images. Furthermore, in some implementations, image features may include metadata associated with digital images and/or image blocks. For example, image features may include GPS coordinates, a date and/or timestamp indicating when a digital image was created, etc. In general, a variety of different image features may be extracted for each image block, and such image features may be used to quantitatively establish relative differences and similarities between image blocks. In other words, relatively similar image features may be extracted from similar image blocks, and the difference between the image blocks may be quantified by comparing the extracted image features.

In some implementations, image features for each image block of a digital image may be automatically extracted upon creation of the digital image. For example, after taking/generating/receiving a digital photograph, a computing device may perform image processing on the digital photograph, identifying one or more image blocks of the digital photograph and extracting image features for each identified image block. Additionally, or alternatively, image features for each image block identified from a plurality of digital images may be automatically extracted prior to compressing the set of image blocks into compressed image data. For example, a computing device may store a plurality of digital images in an uncompressed state. Upon one or more conditions being met (e.g., request to transfer digital images over a network, threshold number of digital images being saved, remaining storage capacity falling below threshold level), the computing device may begin compression of the plurality of digital images, at which point image blocks are identified for each of the digital images, and image features are extracted for each of the image blocks.

Figure 4:
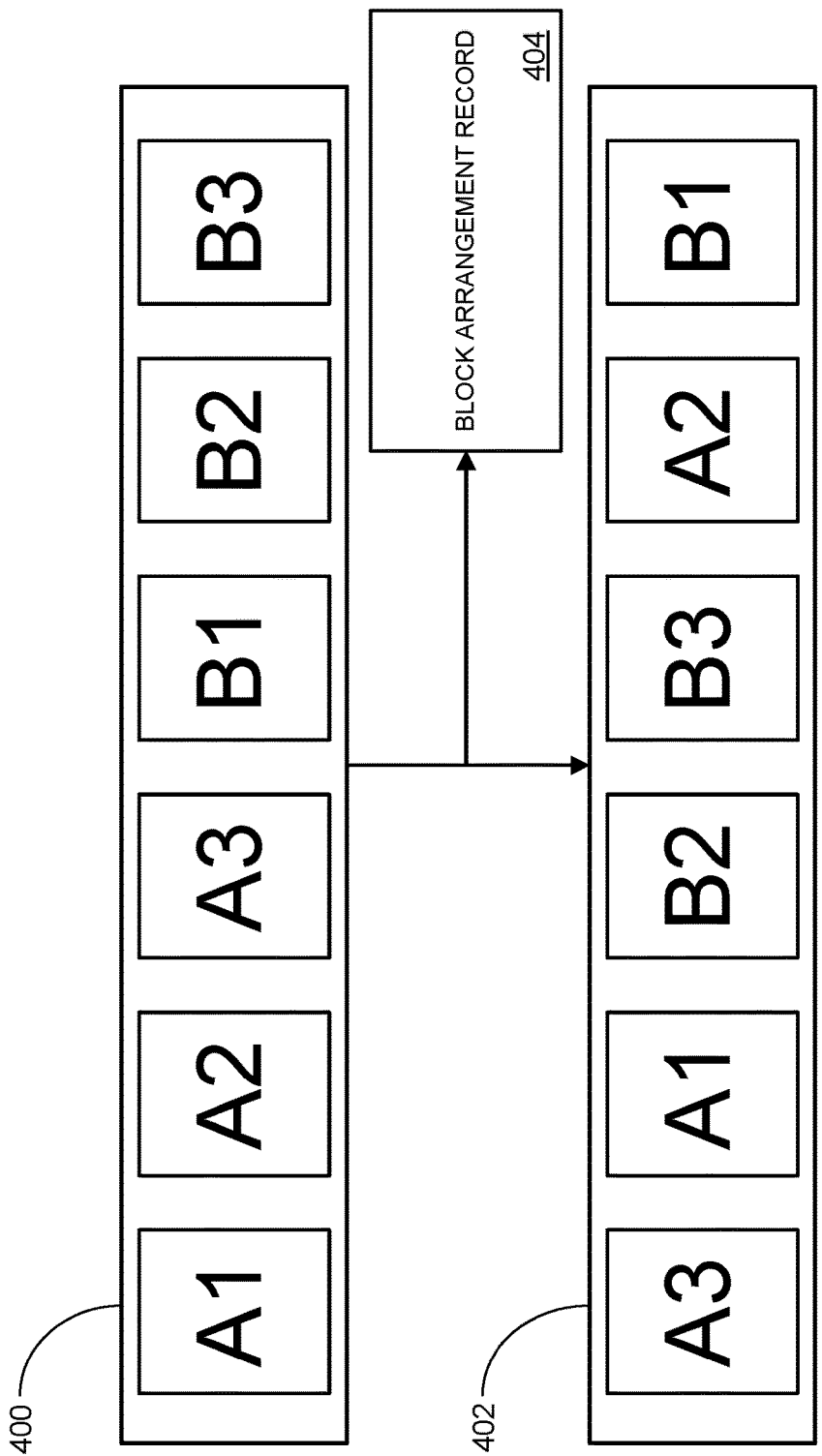
FIG. 4 schematically shows sorting of a set of image blocks into an ordered sequence.

At 106, method 100 includes sorting the set of image blocks into an ordered sequence of image blocks based on an average image feature difference between sequentially sorted image blocks. This is schematically shown in FIG. 4, which schematically shows an example set of image blocks 400. For simplicity of illustration, the photographic content of the image blocks are not illustrated, and are instead replaced with textual identifiers. Specifically, FIG. 4 schematically shows image blocks A1, A2, A3, B1, B2, and B3. Image blocks A1-A3 may be divided from digital image 200A, for example, while image blocks B1-B3 are divided from digital image 200B.

Based on image features extracted for each of the image blocks 400, a computing device may calculate an image feature difference for each pair of image blocks in the set. An image feature difference may quantify the difference between any two image blocks based on the image features extracted for each block, and the specific format of an image feature difference may depend on which image feature(s) are extracted. For example, an image feature difference may be calculated between image block A1 and image block A2. Similarly, an image feature difference may be calculated between image block A1 and image block A3, and so on for each image block in set 400. This may be used by a computing device to calculate an average image feature difference between every two image blocks in the set, of image blocks.

Based on the average image feature difference between image blocks, a computing device may then sore the set of image blocks into an ordered sequence, such as ordered sequence 402 shown in FIG. 4. As shown, ordered sequence 402 still includes image blocks A1-B3, though these image blocks have been reorganized into an ordered sequence. In some implementations, an order of the ordered sequence may be set to minimize the average image feature difference between sequentially sorted image blocks. In other words, an average image feature difference may be calculated for a variety of possible arrangements of image blocks, and a computing device may sort the image blocks into whichever arrangement has the lowest possible average image feature difference. Such rearrangement may not necessarily ensure that the actual image feature difference between any two particular image blocks is minimized—rather it is the average image feature difference for the entire set that is minimized. Further, one or more image blocks of a first digital image may have more in common with image blocks of a second digital image than they have with other image blocks of the first digital image. For example, in ordered sequence 402, image block A2 has been sorted between image blocks B3 and B1, even though such image blocks were divided from a different digital image than image block A2. An ordered sequence of image blocks may then be compressed to a set of compressed image data, as will be described below.

At 108, method 100 optionally includes creating a block arrangement record useable to reconstruct the plurality of digital images from a set of compressed image data. FIG. 4 schematically shows creation of a block arrangement record 404, which may be used to decompress compressed image data into the original digital images. A block arrangement record may describe, for each image block in the ordered sequence, which digital image the image block was divided from, as well as the image block's position within the digital image. For example, block arrangement record 404 may include information indicating that image blocks A1, A2, and A3 may be used to recreate digital image 200A, as well as the specific positions each of the image blocks should occupy within the recreated digital image.

At 110, method 100 includes compressing the set of image blocks into compressed image data based on inter block correlations between image blocks in the ordered sequence. Inter block correlations may refer to any similarities between different digital images and/or image blocks of a plurality of digital images, in contrast to intra image correlations, which only account for similarities between blocks within a single digital image. Compression based on inter block correlations may be performed in a variety of ways, though one possible solution includes generating sets of block-difference data, as will be described below.

Figure 5:
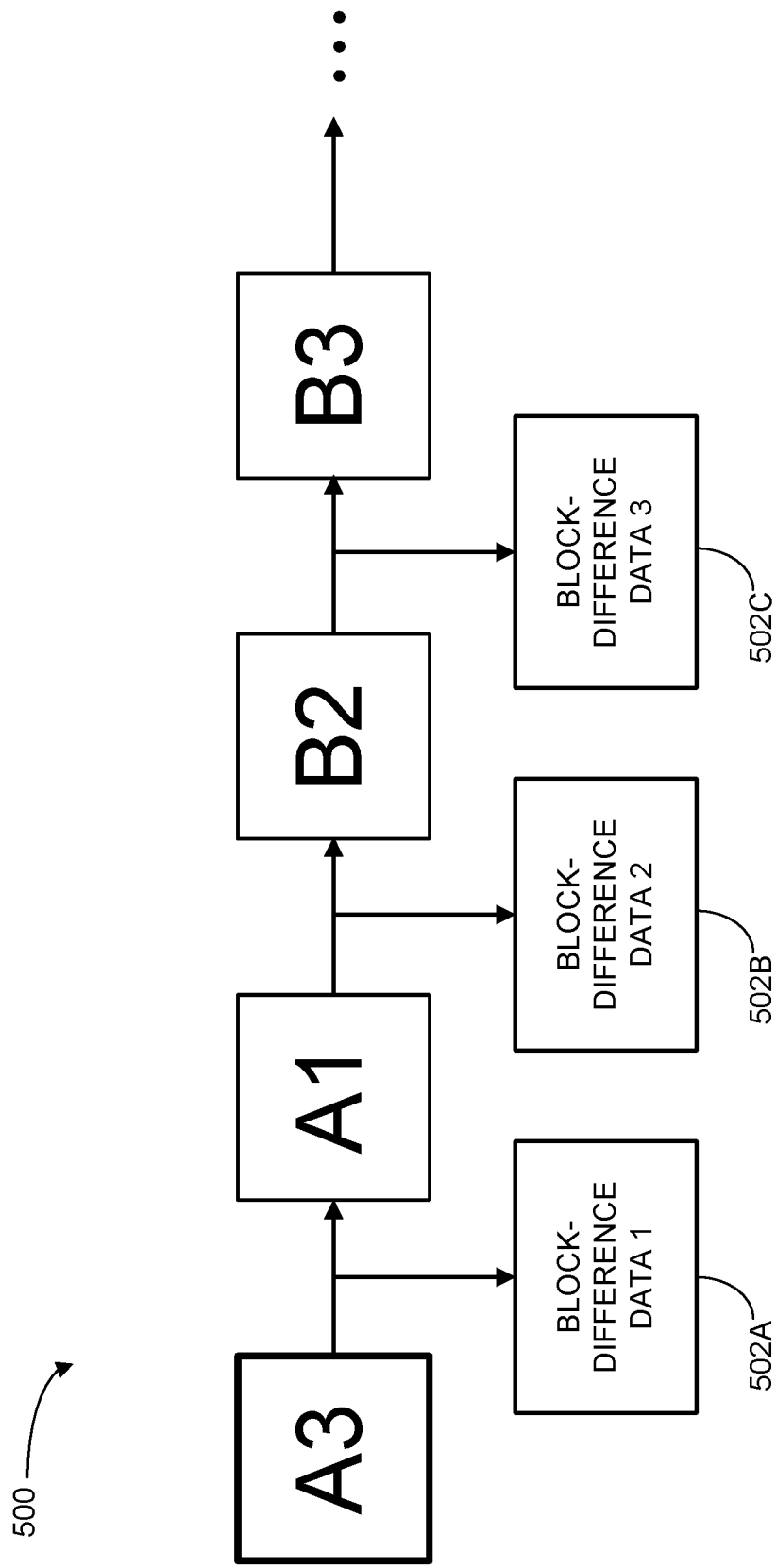
FIG. 5 schematically shows generation of block difference data describing differences between sequentially sorted image blocks.

At 112, method 100 optionally includes establishing a first image block of the ordered sequence as a key image block. This is schematically shown in FIG. 5, which includes a set of image blocks 500, including each of the image blocks shown in ordered sequence 402 of FIG. 4. Image block A3 has been established as a key image block. In some implementations, the first image block in an ordered sequence may automatically be selected as the key image block, though in practice any other image block could be used, in order to speed up the compression process at the expense of efficiency, for example.

At 114, method 100 optionally includes generating sets of block-difference data describing differences between each image block and its predecessor in the ordered sequence. For example, a first set of block-difference data may be generated that describes differences between the key image block and a next image block in the ordered sequence. This is schematically shown in FIG. 5, in which block-difference data 502A is generated, and describes differences between image block A3 (the key image block) and the next image block in the ordered sequence, image block A1. Block-difference data 502A and image block A3 together may be used by a computing device to recreate image block A1, for example by creating a copy of the key image block, and applying any changes specified by the block-difference data 502A. From there, additional sets of block-difference data may be generated describing differences between each subsequent image block and its predecessor in the ordered sequence. Accordingly, any image block in an ordered sequence may be recreated from a key image block and the sets of block-difference data. As shown in FIG. 5, block difference data 502B describes differences between image block B2 and its predecessor image block A1, and block-difference data 502C describes differences between image block B3 and its predecessor image block B2. New key frames optionally may be established. For example, a new key frame may be established every Nth frame, every time an Nth frame differs from an N+1th frame by a threshold amount, and/or based on other criteria.

Figure 6:
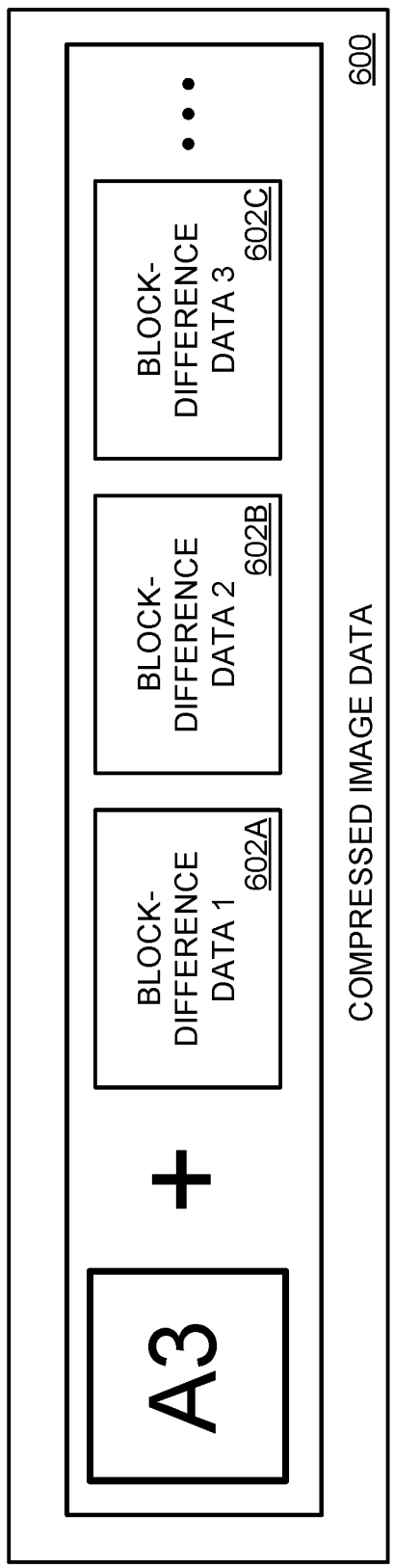
FIG. 6 schematically shows compressed image data.

In some implementation, a computing device may package one or more key image blocks with one or more sets of block-difference data, thereby generating compressed image data. This is schematically shown in FIG. 6, which shows a set of compressed image data 600, including a key image block A3, and multiple sets of block-difference data 602.

Block-difference data as described herein may be a complete description of any and all differences between two distinct image blocks, on a pixel-by-pixel level, for example. Accordingly, compressed image data generated in this manner may be a lossless representation of the uncompressed plurality of digital images. Compressed image data 600 may then be usable to accurately reproduce the uncompressed ordered sequence of image blocks, based on the key image block and the sets of block-difference data. This compressed image data may require less storage space and/or network bandwidth than the uncompressed plurality of digital images, as each set of block-difference data may include less total data than a complete digital image. Alternatively, the compressed image data may be a lossy representation of the plurality of digital images, which may improve compression size at the expense of fidelity, for example.

Figure 7:
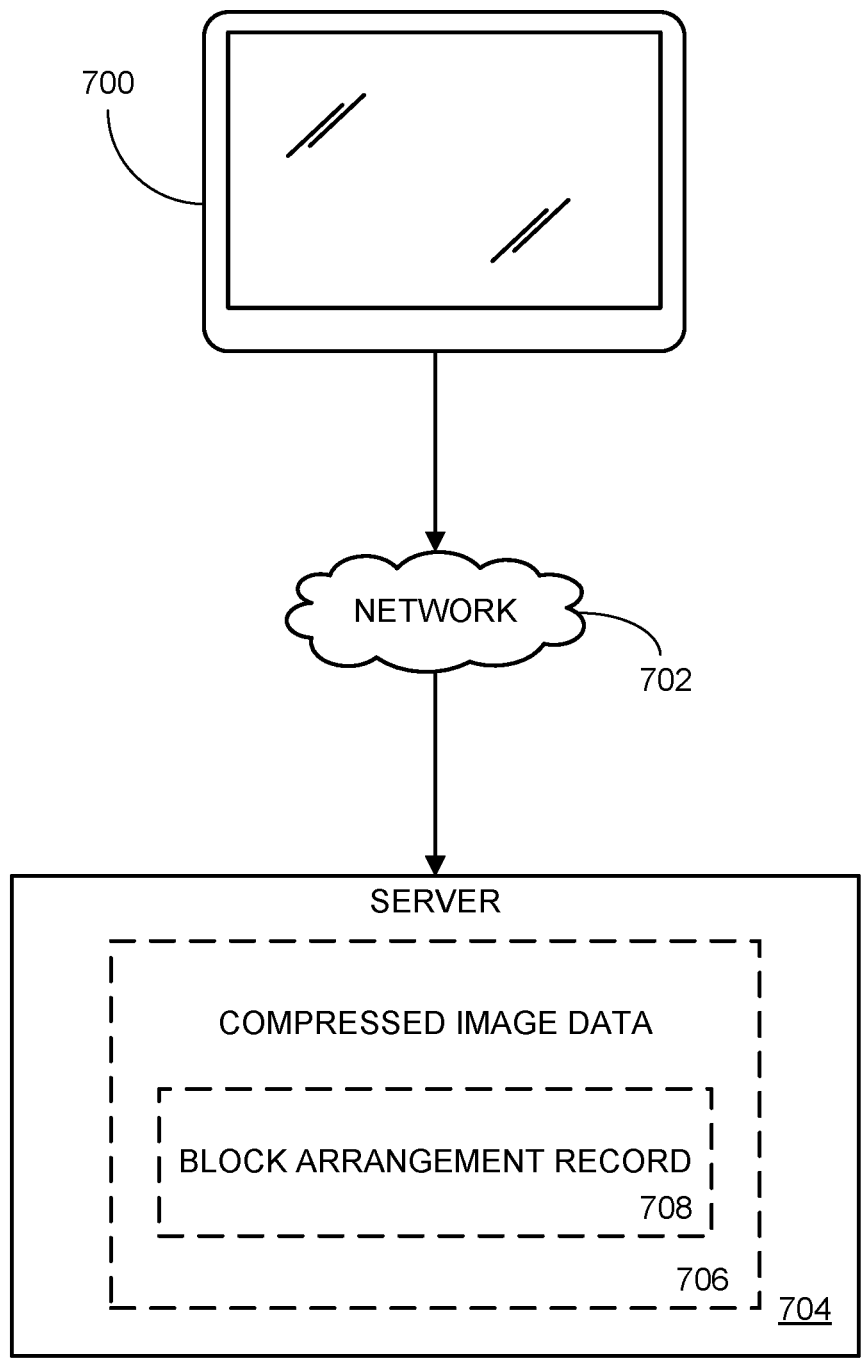
FIG. 7 schematically shows transmission of compressed image data over a computer network.

At 116, method 100 optionally includes transmitting the compressed image data and the block arrangement record over a computer network. This may be done for the purpose of creating an external backup of the plurality of digital images, for example, or for freeing up space on a local computing device. Transmission of compressed image data is schematically illustrated in FIG. 7. FIG. 7 shows an example computing device 700 operatively coupled with a computer network 702 which may be, for example, the Internet. Computing device 700 may be any suitable computing device, and may compress a plurality of digital images into compressed image data as described above. Such compressed image data, as well as the block arrangement record, may be transmitted from the computing device to network 702, and then to one or more server computers, such as server 704, shown storing compressed image data 706 and block arrangement record 708. In some implementations, the block arrangement record may be packaged with the compressed image data. Alternatively, the block arrangement record may be transmitted separately from the compressed image data.

As mentioned above, compressed image data may be usable to recreate an uncompressed plurality of digital images. This may be done by any computing device, such as server computer 704 shown in FIG. 7, for example. In particular, the server computer may be configured to receive the compressed image data, as well as a block arrangement record, via a computer network, and decompress the compressed image data to recreate the plurality of digital images.

In some implementations, such as in a cloud storage scenario, server 704 may receive previously uncompressed digital images, and may apply the above-described compression to save storage space. In some implementations, a server 704 may group digital images from two or more different user-accounts during such compression. Whether user specific or grouped, the server may be configured to recreate a particular image and make the image available to a user with sufficient access privileges responsive to a computer request.

Figure 8:
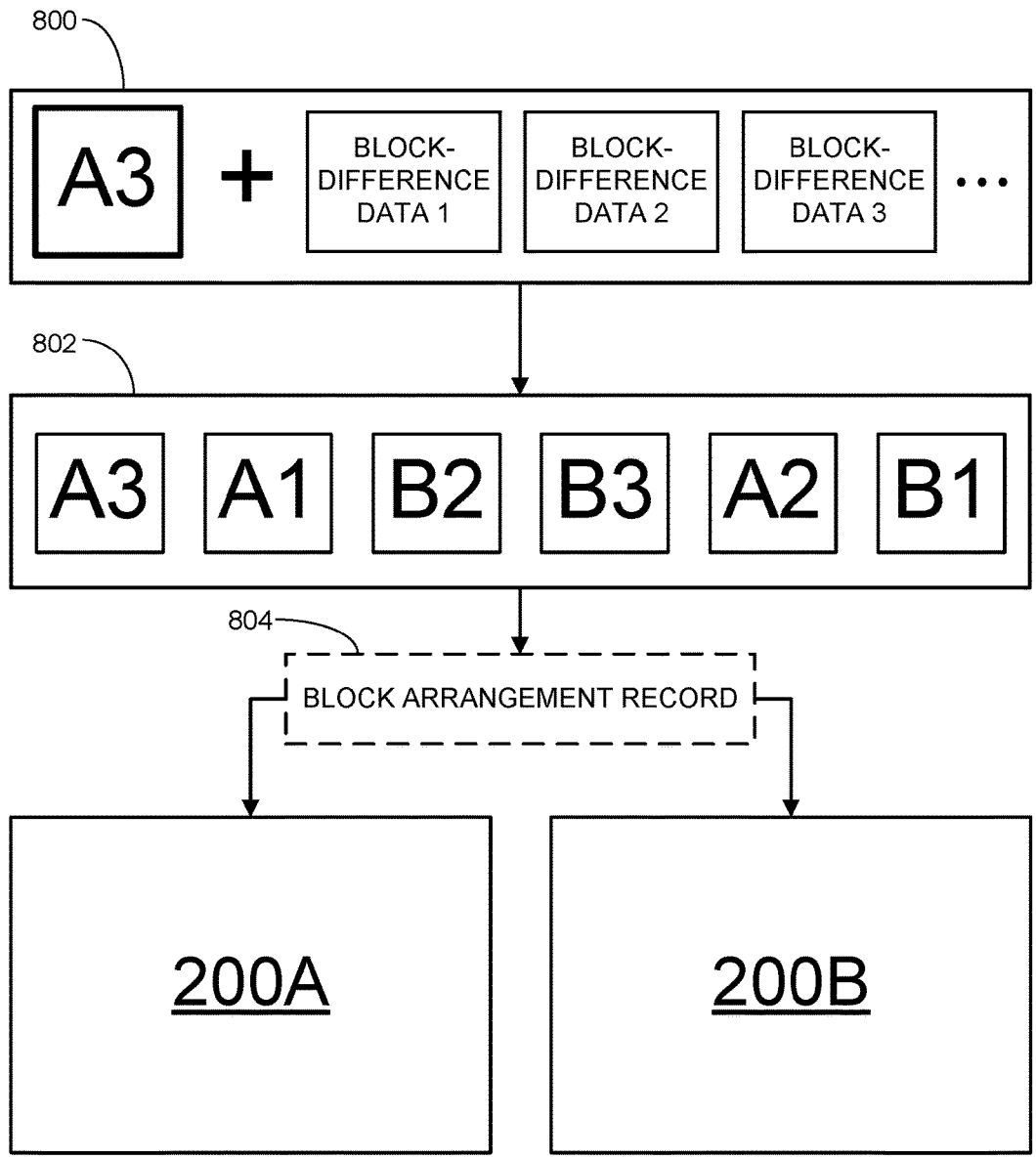
FIG. 8 schematically shows decompression of compressed image data.

The process of decompressing compressed image data is schematically illustrated in FIG. 8. FIG. 8 shows compressed image data 800, which includes a key image block and several sets of block-difference data. As described above, a computing device may be configured to use the sets of block-difference data in combination with the key image block to recreate the ordered sequence of image blocks. This is shown in FIG. 8, in which ordered sequence 802 is recreated from compressed image data 800. At this point, the computing device may use a block arrangement record, such as block arrangement record 804, to recreate a plurality of digital images (i.e., digital images 200A and 200B) from the ordered sequence 804. The plurality of digital images may then be stored. Additionally, or alternatively, compressed image data may be stored by one or more computing devices without being decompressed, thereby reducing the amount of storage space required to store the digital images.

While a particular compression strategy is described above, it is to be understood that block identification and ordering may be used with any other suitable compression strategy.

In some embodiments, the methods and processes described herein may be tied to a computing system of one or more computing devices. In particular, such methods and processes may be implemented as a computer-application program or service, an application-programming interface (API), a library, and/or other computer-program product.

Figure 9:
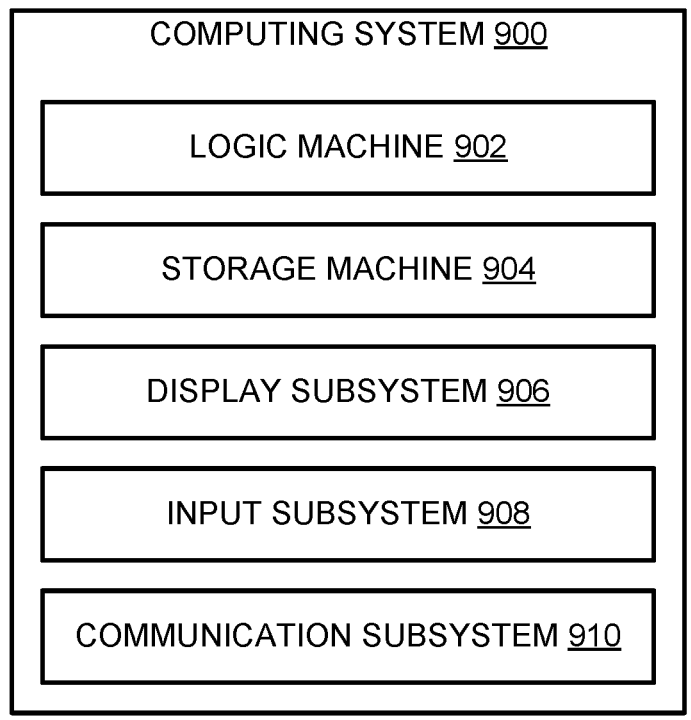
FIG. 9 schematically shows an example computing system.

FIG. 9 schematically shows a non-limiting embodiment of a computing system 900 that can enact one or more of the methods and processes described above. Computing system 900 is shown in simplified form. Computing system 900 may take the form of one or more personal computers, server computers, tablet computers, home-entertainment computers, network computing devices, devices, mobile computing devices, mobile communication devices (e.g., smart phone), and/or other computing devices.

Computing system 900 includes a logic machine 902 and a storage machine 904. Computing system 900 may optionally include a display subsystem 906, input subsystem 908, communication subsystem 910, and/or other components not shown in FIG. 9.

Logic machine 902 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 904 includes one or more physical devices configured to hold instructions executable by the logic machine to implement the methods and processes described herein. When such methods and processes are implemented, the state of storage machine 904 may be transformed—e.g., to hold different data.

Storage machine 904 may include removable and/or built-in devices. Storage machine 904 may include optical memory (e.g., CD, DVD, HD-DVD, Blu-Ray Disc, etc.), semiconductor memory (e.g., RAM, EPROM, EEPROM, etc.), and/or magnetic memory hard-disk drive, floppy-disk drive, tape drive, MRAM, etc.), among others. Storage machine 904 may include volatile, nonvolatile, dynamic, static, read/write, read-only, random-access, sequential-access, location addressable, file-addressable, and/or content-addressable devices.

It will be appreciated that storage machine 904 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 902 and storage machine 904 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 900 implemented to perform a particular function. In some cases, a module, program, or engine may be instantiated via logic machine 902 executing instructions held by storage machine 904. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 906 may be used to present a visual representation of data held by storage machine 904. This visual representation may take the form of a graphical user interface (GUI). As the herein described methods and processes change the data held by the storage machine, and thus transform the state of the storage machine, the state of display subsystem 906 may likewise be transformed to visually represent changes in the underlying data. Display subsystem 906 may include one or more display devices utilizing virtually any type of technology. Such display devices may be combined with logic machine 902 and/or storage machine 904 in a shared enclosure, such display devices may be peripheral display devices.

When included, input subsystem 908 comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 910 may be configured to communicatively couple computing system 900 with one or more other computing devices. Communication subsystem 910 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 900 to send and/or receive messages to and/or from other devices via a network such as the Internet.

In an example, a method for compressing images comprises: identifying a set of image blocks from a plurality of digital images; extracting, for each image block from the set, image features of the image block; sorting the set of image blocks into an ordered sequence of image blocks based on an average image feature difference between sequentially sorted image blocks; and compressing the set of image blocks into compressed image data based on inter block correlations between image blocks in the ordered sequence. In this example or any other example, identifying the set of image blocks includes dividing each of the plurality of digital images into a plurality of image blocks. In this example or any other example, each of the plurality of digital images is divided into a same number of image blocks. In this example or any other example, image features for each image block of a digital image are automatically extracted upon creation of the digital image. In this example or any other example, image features for each image block identified from the plurality of digital images are automatically extracted prior to compressing the set of image blocks. In this example or any other example, the method further comprises creating a block arrangement record useable to reconstruct the plurality of digital images from the compressed image data. In this example or any other example, the method further comprises transmitting the compressed image data and the block arrangement record over a computer network. In this example or any other example, each of the plurality of digital images constitutes a single image block. In this example or any other example, an order of the ordered sequence is set to minimize the average image feature difference between sequentially sorted image blocks. In this example or any other example, compressing the set of image blocks includes: establishing a first image block of the ordered sequence as a key image block; generating a set of block-difference data describing differences between the key image block and a next image block; and generating additional sets of block-difference data describing differences between each subsequent image block and its predecessor in the ordered sequence. In this example or any other example, the compressed image data is a lossless representation of the plurality of digital images.

In an example, a computing device comprises: a logic machine; and a storage machine holding instructions executable by the logic machine to: identify a set of image blocks from a plurality of digital mages; extract, for each image block from the set, image features of the image block; sort the set of image blocks into an ordered sequence of image blocks based on an average image feature difference between sequentially sorted image blocks; compress the set of image blocks into compressed image data based on inter block correlations between image blocks in the ordered sequence; and transmit the compressed image data over a computer network. In this example or any other example, identifying the set of image blocks includes dividing each of the plurality of digital images into a plurality of image blocks. In this example or any other example, the instructions are further executable to create a block arrangement record useable to reconstruct the plurality of digital images from the compressed image data. In this example or any other example, the block arrangement record is transmitted over the computer network with the compressed image data. In this example or any other example, each of the plurality of digital images constitutes a single image block. In this example or any other example, an order of the ordered sequence is set to minimize the average image feature difference between sequentially sorted image blocks. In this example or any other example, compressing the set of image blocks includes: establishing a first image block of the ordered sequence as a key image block; generating a set of block-difference data describing differences between the key image block and a next image block; and generating additional sets of block-difference data describing differences between each subsequent image block and its predecessor in the ordered sequence. In this example or any other example, the compressed image data is a lossless representation of the plurality of digital images.

In an example, a computing device comprises; a logic machine; and a storage machine holding instructions executable by the logic machine to: receive, via a computer network, compressed image data and a block arrangement record; from the compressed image data, extract a set of image blocks; based on the block arrangement record, recreate a plurality of digital images from the set of image blocks; and store the plurality of digital images.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method for compressing digital images, the method comprising:
    identifying a set of image blocks from a plurality of digital images saved using a first amount of storage space of an image compression computer, the set of image blocks having an original order;
    extracting, for each image block from the set, image features of the image block;
    sorting the set of image blocks into a reordered sequence of image blocks to minimize an average image feature difference between sequentially sorted image blocks in the reordered sequence of image blocks, the reordered sequence of image blocks having a different order than the original order; and
    compressing the set of image blocks into compressed image data based on inter block correlations between image blocks in the reordered sequence, the compressed image data using a second amount of storage space of the image compression computer, less than the first amount of storage space.

2. The method of claim 1, where identifying the set of image blocks includes dividing each of the plurality of digital images into a plurality of image blocks.

3. The method of claim 2, where each of the plurality of digital images is divided into a same number of image blocks.

4. The method of claim 1, where image features for each image block of a digital image are automatically extracted upon creation of the digital image.

5. The method of claim 1, where image features for each image block identified from the plurality of digital images are automatically extracted prior to compressing the set of image blocks.

6. The method of claim 1, further comprising creating a block arrangement record useable to reconstruct the plurality of digital images from the compressed image data.

7. The method of claim 6, further comprising transmitting the compressed image data and the block arrangement record over a computer network.

8. The method of claim 1, where each of the plurality of digital images constitutes a single image block.

9. The method of claim 1, where compressing the set of image blocks includes:
  establishing a first image block of the reordered sequence as a key image block;
  generating a first set of block-difference data describing differences between the key image block and a second image block in the reordered sequence; and
  generating additional sets of block-difference data describing differences between each subsequent image block and its predecessor in the reordered sequence, such that a second set of block-difference data describes differences between the second image block and a third image block in the reordered sequence.

10. The method of claim 1, where the compressed image data is a lossless representation of the plurality of digital images.

11. A computing device, comprising:
  a logic machine; and
  a storage machine holding instructions executable by the logic machine to:
    identify a set of image blocks from a plurality of digital images;
    extract, for each image block from the set, image features of the image block;
    sort the set of image blocks into an ordered sequence of image blocks to minimize an average image feature difference between sequentially sorted image blocks;
    establish a first image block of the ordered sequence as a key image block;
    generate a first set of block-difference data describing differences between the key image block and a second image block in the ordered sequence;
    generate additional sets of block-difference data describing differences between each subsequent image block and its predecessor in the ordered sequence, such that a second set of block-difference data describes differences between the second image block and a third image block in the ordered sequence;
    package the key image block and each of the sets of block-difference data as compressed image data; and
    transmit the compressed image data over a computer network.

12. The computing device of claim 11, where identifying the set of image blocks includes dividing each of the plurality of digital images into a plurality of image blocks.

13. The computing device of claim 12, the instructions further executable to create a block arrangement record useable to reconstruct the plurality of digital images from the compressed image data.

14. The computing device of claim 13, where the block arrangement record is transmitted over the computer network with the compressed image data.

15. The computing device of claim 11, where each of the plurality of digital images constitutes a single image block.

16. The computing device of claim 11, where the compressed image data is a lossless representation of the plurality of digital images.

17. A computing device, comprising:
  a logic machine; and
  a storage machine holding instructions executable by the logic machine to:
    receive, via a computer network, compressed image data and a block arrangement record, the compressed image data including a key image block and a plurality of sets of block-difference data, the sets of block-difference data describing inter-block differences between a set of image blocks in a reordered sequence, and the block arrangement record describing differences between the reordered sequence and an original order of the set of image blocks;
    from the compressed image data, recreate the set of image blocks;
    based on the block arrangement record, recreate a plurality of digital images from the set of image blocks; and
    store the plurality of digital images.

* * * * *